(12) United States Patent
Lahaije

(10) Patent No.: US 8,968,882 B2
(45) Date of Patent: Mar. 3, 2015

(54) CLAD SHEET PRODUCT

(75) Inventor: Christiaan Theodorus Wilhelmus Lahaije, Heerhugowaard (NL)

(73) Assignee: Aleris Aluminum Duffel BVBA, Duffel (BE)

( * ) Notice: Subject to any disclaimer, the term of this patent is extended or adjusted under 35 U.S.C. 154(b) by 847 days.

(21) Appl. No.: 12/297,293

(22) PCT Filed: Apr. 19, 2007

(86) PCT No.: PCT/EP2007/003450
§ 371 (c)(1),
(2), (4) Date: Jan. 12, 2009

(87) PCT Pub. No.: WO2007/128391
PCT Pub. Date: Nov. 15, 2007

(65) Prior Publication Data
US 2009/0202860 A1    Aug. 13, 2009

(30) Foreign Application Priority Data

May 2, 2006   (EP) .................................... 06009011

(51) Int. Cl.
| | | |
|---|---|---|
| B32B 15/01 | (2006.01) | |
| C22C 21/00 | (2006.01) | |
| C22C 21/02 | (2006.01) | |
| C22C 21/08 | (2006.01) | |
| C22F 1/05 | (2006.01) | |

(52) U.S. Cl.
CPC ............... B32B 15/016 (2013.01); C22C 21/00 (2013.01); C22C 21/02 (2013.01); C22C 21/08 (2013.01); C22F 1/05 (2013.01)
USPC ....................................................... 428/654

(58) Field of Classification Search
USPC ......................................................... 428/654
See application file for complete search history.

(56) References Cited

U.S. PATENT DOCUMENTS

| | | | |
|---|---|---|---|
| 3,192,752 A | 7/1965 | Dowd et al. | |
| 3,496,620 A | 2/1970 | Wolfe, Jr. | |
| 3,857,973 A | 12/1974 | McKee et al. | |
| 5,232,788 A | 8/1993 | Timsit et al. | |
| 5,266,130 A | 11/1993 | Uchida et al. | |
| 5,480,498 A | 1/1996 | Beaudoin et al. | |
| 5,616,189 A | 4/1997 | Jin et al. | |
| 5,858,134 A * | 1/1999 | Bechet et al. ................. | 148/550 |
| 6,033,499 A * | 3/2000 | Mitra ............................ | 148/688 |
| 6,153,854 A | 11/2000 | Haszler et al. | |
| 6,224,992 B1 | 5/2001 | Delbeke et al. | |
| 6,329,075 B1 | 12/2001 | Nener et al. | |
| 6,337,147 B1 | 1/2002 | Haszler et al. | |
| 6,495,269 B1 | 12/2002 | Haszler et al. | |
| 6,528,183 B2 | 3/2003 | Dif et al. | |
| 6,780,259 B2 | 8/2004 | Bull et al. | |
| 6,848,233 B1 | 2/2005 | Haszler et al. | |
| 6,959,476 B2 | 11/2005 | Li et al. | |
| 2002/0031682 A1 | 3/2002 | Dif et al. | |
| 2003/0087122 A1 | 5/2003 | Benedictus et al. | |
| 2003/0127165 A1 | 7/2003 | Magnusen et al. | |
| 2004/0045643 A1 | 3/2004 | Hewett et al. | |
| 2004/0062946 A1 | 4/2004 | Benedictus et al. | |
| 2005/0000678 A1 | 1/2005 | Van Der Winden | |
| 2005/0011630 A1 | 1/2005 | Anderson et al. | |
| 2006/0185816 A1 | 8/2006 | Anderson et al. | |
| 2007/0137738 A1 * | 6/2007 | Bassi et al. .................... | 148/440 |
| 2009/0169917 A1 | 7/2009 | De Smet et al. | |
| 2009/0202860 A1 | 8/2009 | Lahaije | |
| 2009/0214891 A1 | 8/2009 | Lahaye | |
| 2010/0127125 A1 | 5/2010 | Li et al. | |
| 2010/0279143 A1 | 11/2010 | Kamat et al. | |
| 2011/0165437 A1 | 7/2011 | Timm et al. | |

FOREIGN PATENT DOCUMENTS

| | | |
|---|---|---|
| CA | 2376273 | 1/2001 |
| EP | 0326337 A1 | 8/1989 |
| EP | 0327245 A1 | 9/1989 |
| EP | 0489427 A1 | 6/1992 |
| EP | 623462 A1 * | 11/1994 |
| EP | 0946315 | 10/1999 |
| EP | 1170118 A1 | 1/2002 |
| EP | 1557260 A2 | 7/2005 |
| EP | 1852250 A1 | 11/2007 |
| EP | 1638715 | 10/2008 |
| FR | 2704557 A1 | 11/1994 |
| FR | 2826979 A1 | 1/2003 |
| FR | 2877877 | 5/2006 |
| GB | 925956 | 5/1963 |
| GB | 1004868 | 9/1965 |

(Continued)

OTHER PUBLICATIONS

Sainfort et al., EP 0623462 A1 Machine Translation, worldwide. espacenet.com, Obtained Jan. 4, 2012.*

(Continued)

*Primary Examiner* — Mark Ruthkosky
*Assistant Examiner* — Daniel J Schleis
(74) *Attorney, Agent, or Firm* — Novak Druce Connolly Bove + Quigg LLP

(57) ABSTRACT

The invention relates to a clad sheet product, ideally suitable for automotive body sheet, including a core sheet and a cladding layer on one or both core sheet surfaces, the core sheet has an aluminum alloy of the AA6000-series alloys and at least one cladding consisting of an aluminum alloy of the AA6000-series alloys having a Cu-content of less than 0.25 wt. %.

17 Claims, No Drawings

(56) References Cited

FOREIGN PATENT DOCUMENTS

| | | |
|---|---|---|
| JP | 59089748 | 5/1984 |
| JP | 61049796 | 3/1986 |
| JP | 62122744 | 6/1987 |
| JP | 62122745 | 6/1987 |
| JP | S62158033 A | 7/1987 |
| JP | 63319143 | 12/1988 |
| JP | 64-039340 A | 2/1989 |
| JP | 5148571 A | 6/1993 |
| JP | 05-318147 A | 12/1993 |
| JP | 06-228690 A | 8/1994 |
| JP | 6228691 | 8/1994 |
| JP | 07278711 A | 10/1995 |
| JP | 2000129382 A | 5/2000 |
| JP | 2004-285391 A1 | 10/2004 |
| JP | 2004534152 A | 11/2004 |
| WO | 98/24571 A1 | 6/1998 |
| WO | 9824571 | 6/1998 |
| WO | 9828130 | 7/1998 |
| WO | 0026020 | 5/2000 |
| WO | 0054967 | 9/2000 |
| WO | 0102165 | 1/2001 |
| WO | 0156782 | 8/2001 |
| WO | 0238370 | 5/2002 |
| WO | 0240210 | 5/2002 |
| WO | 03006697 | 1/2003 |
| WO | 2004112992 | 12/2004 |
| WO | WO2005049877 * | 6/2005 |
| WO | 2006/053701 A2 | 5/2006 |
| WO | 2006053701 | 5/2006 |
| WO | 2007128389 | 11/2007 |
| WO | 2007128390 | 11/2007 |
| WO | 2010/126987 A1 | 11/2010 |

OTHER PUBLICATIONS

Feb. 24, 2011 Notice of Allowance issued in U.S. Appl. No. 12/297,302 to De Smet et al.

Final Office Action of Jul. 6, 2010 from U.S. Appl. No. 12/297,300 to De Smet et al.

Hufnagel W: "Key to Aluminum Alloys, 4$^{th}$ Edition", Aluminium-Schlüssel: Key to Aluminium Alloys, 1991, pp. 195-205, XP 002194851 Düsseldorf, Germany pp. 200-202.

Hufnagel W: "Key to Aluminum Alloys, 4$^{th}$ Edition", Aluminium-Schlüssel: Key to Aluminium Alloys, 1991, pp. 168-170, XP 002393173 Düsseldorf, Germany pp. 169-170.

U.S. Appl. No. 11/718,686, international filing date of Nov. 10, 2005 (US National Stage of PCT/EP2005/012192, published as WO 2006/053701 on May 26, 2006).

U.S. Appl. No. 12/297,300, international filing date of Apr. 19, 2007 (US National Stage of PCT/EP2007/003448, published as WO 2007/128390 on Nov. 15, 2007).

U.S. Appl. No. 12/297,302, international filing date of Apr. 19, 2007 (US National Stage of PCT/EP2007/003447, published as WO 2007/128389 on Nov. 15, 2007).

Final Office Action of Sep. 15, 2010 from U.S. Appl. No. 12/297,302 to De Smet et al.

Office action of Nov. 18, 2010 from U.S. Appl. No. 12/297,302 to De Smet et al.

Notice of Allowance of Oct. 27, 2010 from U.S. Appl. No. 12/297,300 to De Smet et al.

Office action of Jan. 6, 2010 from U.S. Appl. No. 12/297,302 to De Smet et al.

Office action of Jan. 8, 2010 from U.S. Appl. No. 12/297,300 to De Smet et al.

U.S. Appl. No. 13/167,747 to De Smet, filed Jun. 24, 2011 (unpublished).

May 24, 2011 non-final Office action for U.S. Appl. No. 11/718,686 to Lahaye.

Office Action of Apr. 2, 2012 from U.S. Appl. No. 13/167,747 to De Smet, filed Jun. 24, 2011.

"Novelis FusionTM AS-250"—for multiple automotive parts, Product Datasheet, Novelis Inc. (Aug. 25, 2008).

"Novelis FusionTM AF-350"—for automotive door inners, Product Datasheet, Novelis Inc. (Aug. 25, 2008).

MetalBulletin Glossary—definition of Clad metals, Emirates Aluminium, published by Metal Bulletin Ltd. (2010).

Online tools—Metals Glossary—Aluminium (C)—definition of Clad Material; URL: < http://www.aalco.co.uk/online-tools/glossary/aluminium/c >, retrieved from the Internet, Apr. 9, 2013.

Constellium, Glossary, definition of Clad sheet, URL: <http://www.constellium.com/aluminium-company/aluminium-properties-and-uses/glossary>, retrieved from the Internet, Apr. 9, 2013.

Wilsons Aluminium Alloy—Glossary of Terms for Aluminium, definition of clad material; URL: < http://www.wilsonsmetals.com/datasheets/Wilsons-Ltd_Aluminium-Alloy_Glossary-of-Terms-for-Aluminium_234.pdf >, p. 5, retrieved from the Internet Apr. 9, 2013.

Office action mailed Mar. 19, 2013 for U.S. Appl. No. 13/167,747 to De Smet filed Jun. 24, 2011.

Final Office Action of Aug. 14, 2012 from U.S. Appl. No. 13/167,747 to De Smet et al. filed Jun. 24, 2011.

Final Office Action of Oct. 24, 2012 from U.S. Appl. No. 11/718,686 to LaHaye filed Jan. 12, 2009.

Office action mailed Nov. 27, 2012 for related U.S. Appl. No. 13/561,360 to De Smet filed Jul. 30, 2012.

Arai et al., "Heat Treating of Aluminum Alloys—Strengthening by Heat Treatment", ASM Handbook, 1991, ASM International, vol. 4, p. 1-78.

Rooy, E., "Ingot Casting Processes", ASM Handbook, 2008, ASM International, vol. 15, p. 1-8.

Official Action issued in connection with U.S. Appl. No. 12/768,429 on Feb. 9, 2012.

International Search Report from PCT/US2010/032735 dated Aug. 6, 2010.

Official Action issued in connection with U.S. Appl. No. 13/616,128 on Oct. 29, 2013.

Official Action issued in connection with U.S. Appl. No. 13/616,128 on Mar. 26, 2013.

International Preliminary Report on Patentability of Nov. 1, 2011 for PCT International Application No. PCT/US2010/032735, International Filing Date Apr. 28, 2010.

Notice of Allowance dated Jul. 3, 2014 to Christiaan Theodorus Wilhelmus Lahaye from U.S. Appl. No. 11/718,686 filed Jan. 12, 2009.

* cited by examiner

CLAD SHEET PRODUCT

This application is a §371 National Stage Application of International Application No. PCT/EP2007/003450, filed on 19 Apr. 2007, claiming the priority of European Patent Application No. 06009011.5 filed on 2 May 2006.

FIELD OF THE INVENTION

The invention relates to an AA6000 or AA6xxx-series aluminium sheet capable of forming a flat hemming. The sheet can be applied as automotive body sheet.

BACKGROUND TO THE INVENTION

Generally, outer body panels of a vehicle require excellent physical properties in formability, dent-resistance, corrosion-resistance and surface quality. However, the conventional AA5000-series alloy sheets have not been favoured because they have low mechanical strength even after press forming and may also exhibit poor surface quality. Therefore, the AA6000-series sheet alloys have been increasingly used. The AA6000-series alloys provide excellent bake hardenability after painting and high mechanical strength, thus making it possible to manufacture more thin-gauged and more light-weight sheets in combination with a class A surface finish.

The vehicle body parts, such as the bonnet and the like, in general, are manufactured by the mechanical assembly between inner parts and outer parts. For example, the proper length of a flange is prepared and formed at the end of an outer panel of a vehicle. An inner panel is fixed onto the inside of the outer panel, and the flange of the outer panel is bent and folded to produce a mechanical binding. The whole process described is called "hemming".

In the hemming process, it is preferred to perform a flat hemming (180° process), which has very strict processing conditions and a relatively low ratio (r/t) between the bending centre radius (r) and the thickness of a sheet (t). However, the bending property of AA6000-series sheet products is inferior to that of AA5000-series alloys. Thus performing a flat hemming at parts where a press induced property is relatively high (i.e., a part with much transformation or deformation) results in a higher defect rate.

U.S. Pat. No. 5,266,130 discloses a process for manufacturing aluminium alloy panels for the automotive industry. The alloy includes as essential components broad ranges of Si and Mg and may also include Mn, Fe, Cu, Ti, etc.

U.S. Pat. No. 5,616,189 discloses a process for producing aluminium sheet for the automotive industry. The aluminium sheet produced from the alloys was subjected to a 5 hour pre-age treatment at 85° C. The aluminium sheet used in this patent was a continuous cast sheet. It is reported that sheet products produced by this route have been found to exhibit poor bendability.

U.S. Pat. No. 6,780,259 discloses a process for producing an aluminium alloy of the AA6xxx-series with carefully selected Mg, Si and Mn-contents. The process has a specific pre-age treatment resulting in improved bendability, including hemming, for use in forming panels for automobiles.

International application WO-98/24571 discloses a multi-layer metal composite product obtained by compound strand casting. The product comprises a core, preferably of an aluminium alloy, on at least one side of the core an interlayer bonded to the core, and a cladding bonded to the interlayer. Depending on the application of the product, the cladding forming the outer surface of the composite product can be an aluminium brazing alloy for use in brazing sheet, an AA1xxx-series alloy to obtain a mirror like surface finish, or it can be a zinc containing aluminium alloy, zinc, or a zinc alloy to improve corrosion resistance.

In spite of these disclosures, there is a great need for selection of aluminium alloy sheets and methods for producing vehicle parts or members providing good strength and levels of formability which permit ease of forming into intricate parts without cracking.

SUMMARY OF THE INVENTION

It is an object of the invention to provide an AA6000-series sheet product having consistent levels of hemming.

It is another object of the invention to provide an AA6000-series sheet product having consistent levels of hemming and sufficient strength for producing vehicle parts or members.

These and other objects and further advantages are met or exceeded by the present invention concerning a clad sheet product having a core sheet and a cladding layer on one or both core sheet surfaces, the core sheet consisting of an aluminium alloy of the AA6xxx-series alloys, and at least one cladding consisting of a different aluminium alloy of the AA6xxx-series alloys having a Cu-content of less than 0.25 wt. %.

Except as otherwise indicated below, all aluminium alloy designations refer to the Aluminum Association designations in Aluminum Standards and Data and the Registration Records, as published by the Aluminum Association in 2006.

For this invention the term "sheet" or "sheet product" refers to a rolled product of over 0.15 mm through 2.5 mm in thickness with sheared, slit, or sawed edges.

For this invention the term "automotive body sheet" or "ABS" refers to aluminium alloy sheet for automotive body applications, in particular exterior panels, interior panels and structural parts.

For this invention the term "automotive" is meant to include automobile and other vehicular parts or members as described herein and other transport parts or members having similar construction.

For any description of alloy compositions or preferred alloy compositions, all references to percentages are by weight percent unless otherwise indicated.

DETAILED DESCRIPTION OF THE PREFERRED EMBODIMENTS

The present invention provides clad sheet product having a core sheet and a cladding layer on one or both core sheet surfaces, the core sheet consisting of an aluminium alloy of the AA6000-series alloys, and at least one cladding consisting of an aluminium alloy of the AA6000-series alloys having a Cu-content of less than 0.25 wt. %, and preferably less than 0.20 wt. %, and more preferably less than 0.10 wt. %.

According to the present invention the properties of the core sheet are disconnected from the demands imposed on the surface of the clad sheet product. Thus, the core sheet alloy can be chosen to meet the mechanical demands as well as possible, whereas the cladding layer can be chosen to meet the demands on interaction with the environment and its forming characteristics in particular. The clad sheet product is capable of forming an improved flat hemming in comparison to the non-clad core sheet, and the clad sheet product can be applied as automotive body sheet.

By selecting an alloy for the cladding layer which is softer (or having a lower hardness) than the alloy of the core sheet, the hemming behaviour is improved while maintaining the strength of the clad sheet product as a whole at a sufficiently high level as a resultant core sheet. The choice of the core material from the AA6000-series for the clad sheet product leads to excellent mechanical properties, as these mechanical properties are substantially determined by the core sheet, comparable with standard industrial sheet alloys used for this application. Tests conducted on specimens of the clad sheet product according to the present invention have shown no significant correlation between the thickness of the cladding and the mechanical properties, thus confirming the above-discussed disconnecting of core material bulk properties from demands imposed on the cladding layer.

The Cu-content in the cladding layer is controlled to the indicated amounts to maintain a good corrosion performance and to control in particular the filiform corrosion resistance, which is an important property when the clad sheet product is used as automotive body sheet.

The use of an AA6000-series cladding also results in the clad sheet product having an improved resistance against scratches during handling of the clad sheet product compared to an alternative AA1000- or AA3000-series cladding layer having a significantly lower hardness.

By using an AA6000-series both for the core and the cladding sheet, although different in composition due to the close similarity in alloy compositions the clad sheet product is very easy to recycle and allows some resilience in the scrap management when producing such a clad sheet product.

In an embodiment the core sheet is an AA6000-series alloy further comprising Cu up to 1.1%, and preferably up to 0.9%.

In a preferred embodiment the core sheet is an aluminium alloy selected from the group consisting of AA6016, AA6022, AA6056, AA6013, and AA6111-series alloy.

These aluminium alloys provide a good balance in strength after painting and baking, bendability and have sufficient strength to resist dents.

In a preferred embodiment the cladding layer on the clad sheet according to the invention comprises a low alloyed AA6000-series aluminium alloy, and preferably an AA6000-series alloy having a substantially balanced $Mg_2Si$ composition to improve the bendability, the hemming performance and the crash performance of the clad sheet product according to this invention. A preferred aluminium alloy has a chemical composition comprising, in wt. %:

Si 0.40 to 0.9, preferably 0.5 to 0.9
Mg 0.40 to 0.8, preferably 0.4 to 0.7
Fe max. 0.35, and preferably <0.25
Cu <0.25, preferably <0.20, and more preferably <0.10
Mn <0.50
Cr <0.30
V <0.30
Zr <0.30
Zn <0.3, preferably <0.1
Ti <0.1,
others and inevitable impurities each <0.05, total 0.15,
balance aluminium.

A more preferred choice is the AA6005 alloy, and more in particular the AA6005A-series alloy, with the proviso for both alloys that the Cu-content is <0.25%, and preferably <0.20%. For the AA6005A alloy the sum of Mn+Cr is preferably less than 0.50%, and more preferably in a range of 0.1-0.50%.

The choice of this particular AA6005 or AA6005A-series aluminium alloy as cladding layer enables an excellent performance of the clad sheet product as regards to the environment. For example, its sensitivity for intergranular corrosion can be controlled within acceptable limits, and further its sensitivity for filiform corrosion, especially in combination with painted surfaces, can be reduced. The AA6005 and AA6005A-series alloys, particularly when having a balanced $Mg_2Si$ composition, provide a significant better hemming performance than the AA6000-series core sheet.

Although the dimensions of the clad sheet product can be varied in many ways (mostly imposed by the specific use and concurrent demands), for the preferred use as automotive body sheet the core material has a thickness in the range of about 0.5 to 2 mm, preferably about 0.7 to 1.3 mm, and most preferably about 1 mm. The cladding layer or layers are much thinner than the core sheet, each clad layer constituting about 1 to 25% of the total clad sheet product thickness. A cladding layer more typically constitutes around about 2 to 14% of the total clad sheet thickness.

In an embodiment the cladding layer is applied on one core sheet surface only.

In another embodiment a cladding layer is applied on both core sheet surfaces, and preferably each cladding layer is made from the same AA6000-series alloy selected. As a result, the composite material exhibits excellent balanced properties, viz. strength and formability versus corrosion performance, dent resistance and hemming performance.

In an embodiment of the clad sheet product at least the AA6000-series core sheet, and preferably also the cladding layer, is brought to a T4 or T4P temper condition in which condition the clad sheet product is formed into a shaped panel or structural component. In this condition the clad sheet product provides the best balance in formability characteristics as evaluated by measuring strength, ductility, and the amount of deformation to cause failure. The "T4P" temper is a condition wherein the sheet product is produced in a T4 process with pre-ageing. The pre-ageing treatment is the last step in the procedure prior to forming the clad sheet product into a shaped panel or structural component for a vehicle. "T4P" tempering typically indicates a process where the alloy sheet has been solution heat treated, pre-aged and naturally aged for at least several hours.

The invention also relates to a formed automotive body panel, e.g. an interior panel or exterior panel or a formed automotive structural part or member, made from the clad sheet product according to this invention. Thus, clad aluminium sheet according to this invention provides a material having the strength and formability for use as vehicle or automotive sheet which can be formed into many different automotive structural members, such as dash panel, floor panel, door panel, reinforcements for panels, etc.

The invention also relates to a method for producing a clad sheet product in which a cladding is applied to at least one side of a core material. In accordance with the present invention the core material comprises an aluminium alloy of the defined AA6000-series, and the defined cladding sheet is attached to the core material by roll bonding to achieve the required metallurgical bonding between the core alloy and the cladding.

Such a roll bonding process is very economical and results in a very effective composite sheet material presenting the desired properties.

Of course, the roll bonding process may be accompanied by several additional processing steps such as for example annealing for obtaining the final properties of the automotive body sheet in the form of the clad sheet product.

When carrying out such a roll-bonding process for producing the clad products according to the present invention, it is preferred that both the core and cladding experience a thickness reduction during the roll bonding.

For example the core material initially can be an about 400 mm thick block having on both sides a cladding initially about 24 mm thick. After roll bonding the final width of the core material was about 1 mm, whereas the final thickness of the cladding is, for example, about 60 μm.

It is noted the initial dimensions and final dimensions of the clad sheet product will be determined both by the specifics of the roll-bonding process as well as the required properties of the final clad sheet product.

The roll bonding process can be carried out in different manners. For example, it is possible for the roll-bonding process to include both hot rolling and cold rolling.

Further, the roll-bonding process may be a one-step process or a multi-step process in which during successive rolling steps the material is gauged down. Separate rolling steps then may be separated by other processing steps, for example annealing steps, heating steps, cooling steps, etc.

In another embodiment according to this invention the defined cladding sheet is attached to the core material by means of a casting technique, for example as disclosed in EP-1638715, incorporated herein by reference.

As expressed above, the clad sheet product in accordance with the present invention is for use as automotive body sheet in vehicles.

The invention will now be illustrated with reference to non-limiting embodiments according to the invention.

Example 1

On an industrial scale two different bare sheet products have been manufactured and processed to sheet products of 1 mm in a T4P temper. The two alloys were AA6016 and AA6111-series alloys, both of which are frequently used for automotive body sheet applications. Also on an industrial scale clad sheet products in the same temper using the same thermal history (for example homogenisation for 10 hours at 560° C.) were manufactured but the AA6016 and AA6111-series alloys were clad on both sides, by regular roll bonding practice, with an AA6005A-series alloy composition. Via hot-rolling the clad product was rolled to an intermediate gauge of 7.5 mm, wherein the hot-mill exit temperature was about 300° C., and then cold rolled to a final gauge of 1 mm. The clad sheet had a total thickness of 1 mm and each clad layer had a thickness of 55 μm.

The exact alloy compositions of the AA6016 and AA6005A are listed in Table 1. All products were solution heat treated at 560° C. and then quenched, and within 1 hour re-heated to about 80° C. followed by coil cooling to room temperature. Then after 2 weeks at room temperature the products were tested while being in the so-called T4P-temper for strength, total elongation and hemming performance. The strength, intergranular corrosion resistance and dent-resistance have been measured after a simulated forming and paint-bake cycle wherein the product in the T4P-temper was further subjected to a 2% cold stretch following by a heat-treatment of 20 minutes at 185° C.

Both the bare sheet products and the clad sheet products have been tested in the T4P condition for their hemming performance via a flat hemming test (bending the samples 180° with a bending radius of 0.0 mm as included in ASTM norm E290-97A) and followed by a visual assessment. A score was given according to the following rating: rating "5" represents no visual defects, "4" mild surface roughening, "3" severe surface roughening, "2" small surface cracks, and "1" represents continuous surface cracks, wherein a further sub-rating of, for example, 3¼, 3½, and 3¾ is used.

Furthermore, the bare AA6016 sheet product and the AA6016 clad with AA6005A have been assessed for their mechanical properties according to ASTM norm EN 10002 for tensile tests. The tensile properties have been determined in the referenced T4P-temper and also after a simulated forming and paint-bake cycle. The intergranular corrosion resistance ("IGC") after the simulated forming and paint-bake cycle was measured according to the European norm ASTM G110-92 and the result is expressed in penetration depth in μm. In addition, the static dent-resistance after the simulated forming and paint-bake cycle was measured wherein the product was mounted and subsequently loaded with a steel indentor having a radius of 63.5 mm with a speed of 2 mm/min, such that from the force-displacement curve the static dent-resistance $F_{0.1\ mm}$ is determined as the force (in N) required to make an indention 0.1 mm deep. All test results are listed in Table 2, in which "n.t." stands for "not-tested".

TABLE 1

Alloy composition in wt. % of the AA6016 and AA6005A, balance aluminium and inevitable impurities.

| Alloy | Si | Fe | Cu | Mn | Mg | Cr | Ti |
|---|---|---|---|---|---|---|---|
| AA6016 | 1.0 | 0.23 | 0.15 | 0.07 | 0.60 | 0.03 | 0.02 |
| AA6005A | 0.6 | 0.20 | 0.09 | 0.12 | 0.55 | 0.01 | 0.01 |

TABLE 2

Test results of the bare alloy sheet and the alloy sheet clad with AA6005A.

| Property and condition | Bare AA6016 | Bare AA6111 | AA6016 with AA6005A clad | AA6111 with AA6005A clad |
|---|---|---|---|---|
| Yield strength (MPa) in T4P | 141 | n.t. | 137 | n.t. |
| Total elongation (%) in T4P | 23.8 | n.t. | 24.7 | n.t. |
| Hemming in T4P | 1¼ | 1½ | 3¼ | 3¼ |
| Yield strength after 2% + 185° C./20 min | 258 | n.t. | 253 | n.t. |
| IGC (μm) after 2% + 185° C./20 min | 118 | n.t. | 76 | n.t. |
| Dent-resistance $F_{0.1\ mm}$ (N) after 2% + 185° C./20 min | 260 | n.t. | 256 | n.t. |

From the results of Table 2 it can be seen that by applying a thin clad layer of the AA6005A alloy the hemming performance of both the AA6016 and AA6111 are improved, while from the comparison of the bare AA6016 and the clad-AA6016 it can be seen that the intergranular corrosion resistance is significantly improved. These improvements are obtained while maintaining high strength levels and good formability as expressed in elongation, and without adversely affecting the dent resistance. It is believed there is no difference in dent-resistance between bare AA6016 and clad AA6016 as the variation in within normal measurement inaccuracy.

In the present example the core alloys have been clad on both sides for practical reasons in the production thereof, but it will be immediately apparent to the skilled person that the same benefits can be obtained by using only a single clad layer.

This example illustrates the principle of the present invention that the hemming performance of an AA6000-series alloy suitable for automotive body sheet can be improved by providing it with a suitable cladding layer together with a significant improvement in corrosion resistance, while still benefiting from the favourable characteristics of the core sheet such as its strength, paint bake response and dent resistance.

The invention is not limited to the embodiments described by the present specification, which may be varied widely within the scope of the invention as defined by the appended claims.

The invention claimed is:

1. A formed automotive structural member having a flat hem made from an automotive body sheet consisting of a clad sheet product consisting of a core sheet having a cladding layer on one core sheet surface only,
    the core sheet is of an aluminium alloy selected from the group consisting of AA6016 and AA6111-series alloys and
    the cladding is of an AA6005A-series alloy having a Cu-content of less than 0.25 wt. % and the sum of Mn+Cr content is in a range of 0.1 to 0.50%, and
    wherein the core sheet has a composition different from the cladding sheet, wherein at least the core sheet is in a T4 temper or T4P temper, wherein the core sheet has a thickness in the range of 0.5 to 2 mm, wherein the cladding layer has a thickness in the range of 1 to 25% of the total thickness of the clad sheet product,
    wherein the body sheet has a hemming performance rating of at least 3.25.

2. The formed automotive structural member according to claim 1, wherein the core sheet is selected from the group consisting of AA6016, and AA6111-series alloy wherein Cu is at most 1.1 wt. %.

3. The formed automotive structural member according to claim 1, wherein the core sheet is harder than the cladding layer.

4. The formed automotive structural member according to claim 1, wherein the cladding is of AA6005A-series alloy and the Cu-content in the cladding layer is <0.20%.

5. The formed automotive structural member according to claim 1, wherein the Fe-content in the cladding layer is <0.25%.

6. The formed automotive structural member according to claim 1, wherein the cladding is of AA6005A-series aluminium alloy and the Mg-content in the cladding layer is in a range of 0.4 to 0.7%.

7. The formed automotive structural member according to claim 1, wherein the core sheet has a thickness in the range of 0.5 to 1 mm.

8. The formed automotive structural member according to claim 1, wherein the cladding layer has a thickness in the range of 5 to 12% of the total thickness of the clad sheet product.

9. The formed automotive structural member according to claim 1, wherein said member is an exterior body panel.

10. The formed automotive structural member according to claim 1, wherein the core sheet is an aluminium alloy selected from the group consisting of AA6016-series alloy wherein Cu is at most 0.9 wt. %.

11. The formed automotive structural member according to claim 1, wherein the Cu-content in the cladding layer is <0.10%.

12. The formed automotive structural member according to claim 1, wherein the cladding layer has a thickness in the range of 2 to 12% of the total thickness of the clad sheet product.

13. The formed automotive structural member according to claim 1, wherein the core sheet is an aluminium alloy selected from the group consisting of AA6016-series alloy.

14. The formed automotive structural member according to claim 1, wherein the core sheet is AA6111-series alloy wherein Cu is at most 0.9 wt. %.

15. The formed automotive structural member according to claim 1, wherein the core sheet is an aluminium alloy selected from the group consisting of AA6111-series alloy.

16. The formed automotive structural member according to claim 1, wherein the core sheet is AA6016-series;
    wherein the clad sheet of AA6005A has the composition in wt. %:
    Si 0.5-0.9
    Fe 0.2-0.35
    Cu 0.09-less than 0.20
    Mn 0.12-0.50
    Mg 0.4-0.7
    Cr 0.01-0.30
    Zn less than 0.10
    Ti 0.01-0.10;
    wherein the sum of Mn+Cr is in the range of 0.13 to 0.50%.

17. The formed automotive structural member according to claim 1, wherein the core sheet is AA6111-series;
    wherein the clad sheet of AA6005A has the composition in wt. %:
    Si 0.5-0.9
    Fe 0.2-0.35
    Cu 0.09-less than 0.20
    Mn 0.12-0.50
    Mg 0.4-0.7
    Cr 0.01-0.30
    Zn less than 0.10
    Ti 0.01-0.10;
    wherein the sum of Mn+Cr is in the range of 0.13 to 0.50%.

* * * * *